United States Patent
Wen et al.

(10) Patent No.: US 12,021,405 B2
(45) Date of Patent: Jun. 25, 2024

(54) ELECTRICITY POWER STORAGE AND DISTRIBUTION METHOD, DEVICE AND SYSTEM

(71) Applicant: GREE ELECTRIC APPLIANCES, INC. OF ZHUHAI, Zhuhai (CN)

(72) Inventors: Wu Wen, Zhuhai (CN); Shugong Nan, Zhuhai (CN); Lei Li, Zhuhai (CN); Shiyong Jiang, Zhuhai (CN); Zhigang Zhao, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 536 days.

(21) Appl. No.: 17/334,707

(22) Filed: May 29, 2021

(65) Prior Publication Data

US 2021/0288514 A1    Sep. 16, 2021

Related U.S. Application Data

(63) Continuation of application No. PCT/CN2019/095526, filed on Jul. 11, 2019.

(30) Foreign Application Priority Data

Jul. 31, 2018    (CN) .......................... 201810858698.9

(51) Int. Cl.
H02J 7/00    (2006.01)
(52) U.S. Cl.
CPC ...... *H02J 7/007182* (2020.01); *H02J 7/0068* (2013.01)
(58) Field of Classification Search
CPC .............................................. H02J 7/007182
(Continued)

(56) References Cited

U.S. PATENT DOCUMENTS

| 9,780,589 B2 * | 10/2017 | Yoshida | ................. H02J 7/0068 |
| 2016/0126783 A1 * | 5/2016 | Cheng | ..................... H02J 9/062 |
| | | | 307/66 |
| 2017/0353042 A1 * | 12/2017 | Liu | ................... H01M 10/4257 |

FOREIGN PATENT DOCUMENTS

| CN | 103236712 A | 8/2013 |
| CN | 103390900 A | 11/2013 |

(Continued)

OTHER PUBLICATIONS

Written Opinion issued in counterpart Singapore Patent Application No. 11202105779U, dated Jul. 5, 2022.

(Continued)

*Primary Examiner* — Yalkew Fantu
(74) *Attorney, Agent, or Firm* — Westbridge IP LLC (57) ABSTRACT

Disclosed in the present disclosure are a direct current power distribution method, a direct current power distribution device and a direct current power distribution system. The method includes: determining working modes of a direct current power distribution system, correspondingly obtaining, under different working modes, working parameters of the direct current power distribution system, and regulating operation of the direct current power distribution system according to the working parameters to achieve an electric energy balance of a power consumption side, a power generation side of a power grid, and an energy storage side. According to the embodiments of the present disclosure, by the regulating of the direct current power distribution system, an electric energy balance among the power consumption side, the power generation side of the power grid, and the energy storage side is achieved.

19 Claims, 4 Drawing Sheets

---

Determining working modes of the direct current power distribution system — S101

Correspondingly obtaining, under different working modes, working parameters of the direct current power distribution system — S102

Regulating operation of the direct current power distribution system according to the working parameters to achieve an electric energy balance of a power consumption side, a power generation side of a power grid and an energy storage side of the direct current power distribution system — S103

(58) Field of Classification Search
USPC .......................................................... 320/134
See application file for complete search history.

(56) References Cited

FOREIGN PATENT DOCUMENTS

| | | |
|---|---|---|
| CN | 104079008 A | 10/2014 |
| CN | 102751943 B | 4/2015 |
| CN | 104505867 A | 4/2015 |
| CN | 105552878 A | 5/2016 |
| CN | 106786489 A | 5/2017 |
| CN | 107248700 A | 10/2017 |
| CN | 107785931 A | 3/2018 |
| CN | 108964007 A | 12/2018 |
| WO | 2018100398 A1 | 6/2018 |

OTHER PUBLICATIONS

Requisition by the Examiner issued in counterpart Canadian Patent Application No. 3,121,883, dated May 23, 2023.
First Office Action issued in counterpart Chinese Patent Application No. 201810858698.9, dated Dec. 13, 2019.
International Search Report issued in corresponding PCT Application No. PCT/CN2019/095526, dated Sep. 18, 2019.
Second Office Action issued in counterpart Chinese Patent Application No. 201810858698.9, dated Mar. 11, 2020.
Written Opinion issued in corresponding PCT Application No. PCT/CN2019/095526, dated Sep. 18, 2019.

* cited by examiner

ELECTRICITY POWER STORAGE AND DISTRIBUTION METHOD, DEVICE AND SYSTEM

CROSS-REFERENCE TO RELATED APPLICATIONS

The present disclosure is a continuation of International Application No. PCT/CN2019/095526, filed on Jul. 11, 2019, which claims priority to Chinese Patent Application No. 201810858698.9, filed on Jul. 31, 2018. All applications are incorporated herein by reference in their entireties.

TECHNICAL FIELD

The present disclosure relates to the field of energy technologies, and in particular to a direct current power distribution method, a direct current power distribution device and a direct current power distribution system.

BACKGROUND

At present, with popularization and promotion of solar distributed photovoltaic power generation and new energy utilization, in a new energy micro-grid system, a demand for directly using low-voltage direct current power distribution of direct current power to reduce alternating current conversion links is becoming more and more intense. However, an application of direct current low-voltage power distribution is still in a customization stage. That is, customized development for specifications and forms of an equipment is carried out, lack unified standards, thereby bringing inconvenience to the application and design of the low-voltage direct current power distribution.

In view of a problem that the customized design of the low-voltage direct current power distribution is inconvenient, thereby affecting the popularization of the low-voltage direct current power distribution in related technologies, no effective solutions have been proposed.

SUMMARY

At least some embodiments of the present disclosure provide a direct current power distribution method, device and system to at least partially solve a problem that customized design of low-voltage direct current power distribution is inconvenient, thereby affecting popularization of the low-voltage direct current power distribution in related technologies.

In an embodiment of the present disclosure, a direct current power distribution method is provided. The direct current power distribution method is applied to a direct current power distribution system. the method includes:
  determining working modes of the direct current power distribution system;
  correspondingly obtaining, under different working modes, working parameters of the direct current power distribution system; and
  regulating operation of the direct current power distribution system according to the working parameters to achieve an electric energy balance of a power consumption side, a power generation side of a power grid, and an energy storage side of the direct current power distribution system.

In an alternative embodiment, the regulating operation of the direct current power distribution system according to the working parameters includes:

regulating operation of a direct current frequency conversion cabinet, an intelligent converter and an energy storage device in the direct current power distribution system according to the working parameters.

In an alternative embodiment, the determining working modes of the direct current power distribution system includes:
  determining the working modes including an intelligent converter priority output power mode and an intelligent converter constant power output mode.

In an alternative embodiment, the correspondingly obtaining, under different working modes, working parameters of the direct current power distribution system includes:
  obtaining, in the intelligent converter priority output power mode, output power of the intelligent converter and a SoC value of the energy storage device; and
  obtaining, in the intelligent converter constant power output mode, a frequency change of the direct current frequency conversion cabinet, the output power of the intelligent converter and the SoC value of the energy storage device.

In an alternative embodiment, the regulating operation of the direct current power distribution system according to the working parameters includes:
  controlling the energy storage device to discharge, when the working mode is the intelligent converter priority output power mode, and the output power of the intelligent converter is determined to be greater than or equal to a first preset power value; or
  controlling the energy storage device to discharge, when the output power of the intelligent converter is determined to be less than a second preset power value.

The second preset power value is less than the first preset power value.

In an alternative embodiment, the controlling the energy storage device to discharge, when the output power of the intelligent converter is determined to be greater than or equal to a first preset power value includes:
  controlling the energy storage device to successively increase discharge output power according to a first preset power increase value until a maximum discharge output power threshold is reached, when the SoC value is determined to be greater than a first preset SoC value; and
  when the SoC value is determined to be less than a second preset SoC value, controlling the energy storage device without starting a discharge function, or controlling the energy storage device to successively decrease the discharge output power according to a first preset power decrease value until zero is reached, or stopping discharging when a stop discharging instruction input by a user is received.

The first preset SoC value is greater than the second preset SoC value, and the first preset power increase value is equal to the first preset power decrease value.

In an alternative embodiment, the controlling the energy storage device to discharge, when the output power of the intelligent converter is determined to be less than a second preset power value includes:
  controlling the energy storage device to successively decrease discharge output power by a first preset power decrease value until zero is reached, and then stopping discharging.

In an alternative embodiment, the method further includes:
  controlling the energy storage device to charge according to an electricity price state and the SoC value, when the energy storage device is in a discharging stop state, and the output power of the intelligent converter is determined to be less than or equal to a third preset power value.

In an alternative embodiment, the controlling the energy storage device to charge according to an electricity price state and the SoC value includes:
controlling the energy storage device to charge when an electricity price is determined to be a valley electricity price and the SoC value is determined to be less than a third preset SoC value;
controlling the energy storage device to charge when the electricity price is determined to be a flat electricity price and the SoC value is determined to be less than a fourth preset SoC value; and
controlling charging power of the energy storage device to successively increase from zero according to the first preset power increase value when the energy storage device is charged, and stopping increasing the charging power until the output power of the intelligent converter is monitored to be greater than or equal to a fourth preset power value.

The third preset SoC value is greater than the fourth preset SoC value.

In an alternative embodiment, the method further includes:
controlling the energy storage device to charge according to the electricity price state and the SoC value, when the energy storage device is in a charging state and the output power of the intelligent converter is determined to be greater than or equal to a fifth preset power value.

In an alternative embodiment, the controlling the energy storage device to charge according to the electricity price state and the SoC value includes:
controlling the energy storage device to charge when an electricity price is determined to be a valley electricity price and the SoC value is determined to be greater than a fifth preset SoC value;
controlling the energy storage device to charge when the electricity price is determined to be a flat electricity price and the SoC value is determined to be greater than a sixth preset SoC value; and
controlling charging power of the energy storage device to successively decrease according to a second preset power decrease value when the energy storage device is charged, and stopping charging until zero is reached.

The second preset power decrease value is greater than the first preset power decrease value.

In an alternative embodiment, the method further includes:
when the energy storage device is in a forced charging mode and power of the intelligent converter is controlled to decrease to a sixth preset power value, controlling the energy storage device to charge, and controlling charging power of the energy storage device to successively increase according to a first preset power increase value until a maximum charging power threshold is reached; and
when the SoC value is monitored to be greater than or equal to a seventh preset SoC value, controlling the charging power of the energy storage device to successively decrease according to a second preset power decrease value, and stopping charging until zero is reached.

In an alternative embodiment, the method further includes:
when the energy storage device is in a forced discharging mode and power of the intelligent converter is controlled to increase to a seventh preset power value, controlling the energy storage device to discharge, and controlling discharging power of the energy storage device to successively increase according to a first preset power increase value until a maximum discharging power threshold is reached; and
when the SoC value is monitored to be less than or equal to a second preset SoC value, controlling the discharging power of the energy storage device to successively decrease according to a second preset power decrease value, and stopping discharging until zero is reached.

In an alternative embodiment, the method further includes:
controlling the intelligent converter to increase the output power to meet an actual power demand of a load connected with the direct current frequency conversion cabinet, when the direct current frequency conversion cabinet is monitored to successively increase a frequency according to a preset rate; and
controlling the direct current frequency conversion cabinet belonging to the intelligent converter to stop increasing the frequency, when an output power value of the intelligent converter is monitored to be greater than or equal to an eighth preset power value. The output power of the direct current frequency conversion cabinet is a first preset power threshold, when the system is in an energy storage device discharge mode. The output power of the direct current frequency conversion cabinet is a second preset power threshold, when the system is in an energy storage discharge mode and a grid power supply mode.

In an alternative embodiment, the regulating operation of the direct current power distribution system according to the working parameters includes:
controlling the direct current frequency conversion cabinet to automatically adjust a frequency until the power of the intelligent converter is monitored to be less than preset constant power and a difference between the power of the intelligent converter and the preset constant power is less than a preset difference, and then running according to the preset constant power; and
controlling the energy storage device to avoid working at this time.

In an alternative embodiment, the regulating operation of the direct current power distribution system according to the working parameters includes:
querying a discharge power margin PFY of the energy storage device, when the working mode is the intelligent converter constant power output mode, and the direct current frequency conversion cabinet is determined to need to increase a frequency;
controlling the direct current frequency conversion cabinet to successively increase the frequency according to a preset rate, if the PFY is greater than or equal to a preset PFY value; and
prohibiting the direct current frequency conversion cabinet from increasing the frequency, and at this time, power of the direct current frequency conversion cabinet being reached to a maximum preset power value, if the PFY is less than the preset PFY value. The PFY is determined according to current discharge power of the energy storage device, when the SoC value of the energy storage device is greater than a first preset SoC value.

In an alternative embodiment, the regulating operation of the direct current power distribution system according to the working parameters includes:

when the working mode is the intelligent converter constant power output mode, a frequency of the direct current frequency conversion cabinet is determined to successively decrease and the energy storage device is in a discharging state, and the output power of the intelligent converter is monitored to be less than preset constant power, controlling the energy storage device to successively decrease discharge output power according to a first preset power decrease value until zero is reached, and then stopping discharging.

In an alternative embodiment, when the energy storage device is in a discharging stop state, the method includes:

controlling the energy storage device to charge and controlling charging power to successively increase according to a first preset power increase value, if the output power of the intelligent converter is determined to be less than the preset constant power and a difference between the output power and the preset constant power is greater than a preset difference;

stopping increasing the charging power, if the output power is determined to be greater than the preset constant power and the difference between the output power and the preset constant power is greater than the preset difference. The charging power is not greater than a maximum preset charging power value, and correspondingly, power of the intelligent converter is not less than a power critical value;

controlling the charging power to successively decrease according to a second preset power decrease value until charging is stopped, if the SoC value is greater than a SoC critical value;

controlling the direct current frequency conversion cabinet to automatically adjust the frequency, so that the output power of the intelligent converter is less than the preset constant power and the difference between the output power and the preset constant power is less than the preset difference, if the energy storage device is fully charged;

performing charging and controlling the charging power to successively increase according to the first preset power increase value until a preset charging power threshold is reached, if the SoC value is less than a second preset SoC value; at the same time, controlling the power of the intelligent converter to successively decrease until being less than the preset constant power and a difference between the power and the preset constant power is less than a preset difference; and stopping the charging, when the SoC value is greater than the second preset SoC value.

In an alternative embodiment, the method includes:

when the energy storage device is in a forced charging mode, controlling power of the intelligent converter to be successively adjusted to a power critical value, and controlling the charging power to successively increase according to a first preset power increase value until a charging power critical value is reached; and stopping charging and successively restoring to an initial default state, when the SoC value is greater than a SoC critical value.

In an alternative embodiment, the method includes:

when the energy storage device is in a forced discharging mode, controlling power of the intelligent converter to be successively adjusted to a maximum power critical value, and controlling discharge power to be adjusted to a maximum critical value; and stopping discharging and successively restoring to an initial default state, when the SoC value is less than a second preset SoC value.

In an embodiment of the present disclosure, a direct current power distribution system is also provided, the system is used to execute the above direct current power distribution method. The system includes: a system control cabinet, an intelligent converter, a direct current frequency conversion cabinet and an energy storage device.

The intelligent converter is connected with the direct current frequency conversion cabinet and is configured to provide electrical energy to the direct current frequency conversion cabinet.

The direct current frequency conversion cabinet is configured as a load connected with a power consumption side.

The system control cabinet is respectively connected with the intelligent converter, the direct current frequency conversion cabinet and the energy storage device, and is configured to obtain working parameters of the intelligent converter, the direct current frequency conversion cabinet and the energy storage device, and regulate operation of the direct current power distribution system according to the working parameters to achieve an electric energy balance of a power consumption side, a power grid side and an energy storage device side.

In an alternative embodiment, the system further includes an alternating current power distribution cabinet.

The alternating current power distribution cabinet is respectively connected with a power grid system, the intelligent converter and the system control cabinet. The alternating current power distribution cabinet is configured to transmit electrical energy of the power grid system to the direct current power distribution system, provide alternating current power to the intelligent converter, connect with an alternating current load and provide electrical energy to the connected alternating current load.

The alternating current power distribution cabinet is configured to monitor power input from the power grid system and power consumption of each branch load, and send a monitoring result to the system control cabinet, so that the system control cabinet performs analysis according to the monitoring result.

The alternating current power distribution cabinet has an electrical energy input isolation switch and an electrical energy output isolation switch, and internal components of the alternating current power distribution cabinet are arranged in a hierarchical manner.

In an alternative embodiment, the system further includes a direct current power distribution cabinet.

The direct current power distribution cabinet is respectively connected with the system control cabinet, the direct current frequency conversion cabinet and the intelligent converter, and is configured to receive electrical energy provided by the intelligent converter, connect with a direct current power generation system and/or a direct current load, and provide electrical energy to the direct current frequency conversion cabinet and/or the direct current load; and is configured to provide a dual power supply capability for the direct current power distribution system.

The direct current power distribution cabinet is equipped with a direct current circuit breaker and a fuse inside, and has protection functions of over-current and over-voltage.

In an alternative embodiment, the direct current power distribution cabinet is further configured to: connect to the direct current power generation system through a direct current bus, output a first preset direct current voltage, a second preset direct current voltage and a preset isolation safety voltage value through a DC/DC conversion mode of the intelligent converter. The direct current power distribution cabinet is further configured to monitor a power condition obtained from the direct current bus and the power consumption of each branch direct current load, and send a monitoring result to the system control cabinet, so that the control cabinet performs analysis according to the monitoring result.

In an alternative embodiment, the intelligent converter may also be connected with a direct current power generation system, a power grid system and an AC/DC load, and is configured to perform power transmission.

In an alternative embodiment, the direct current power generation system is a photovoltaic power generation system.

In an alternative embodiment, the direct current frequency conversion cabinet is connected with the intelligent converter and an alternating current load, and is configured to output a frequency conversion voltage to the connected alternating current load. The direct current frequency conversion cabinet is connected with a direct current bus and has multiple power consumption interfaces, is configured to drive frequency conversion operation of the load when total power of the connected load is less than or equal to a power threshold of the direct current frequency conversion cabinet.

In an alternative embodiment, the load is a motor.

In an alternative embodiment, the system control cabinet is configured to collect operating data information of the alternating current power distribution cabinet, the intelligent converter, the direct current power distribution cabinet, the direct current frequency conversion cabinet and the energy storage device through a communication interface. The system control cabinet is configured to generate an operation strategy and issue a control instruction according to the operation strategy to control a coordination work of the alternating current power distribution cabinet, the intelligent converter, the direct current power distribution cabinet, the direct current frequency conversion cabinet and the energy storage device.

In an alternative embodiment, the energy storage device is configured to perform charging or discharging under the control instruction.

In an alternative embodiment, the system control cabinet, the direct current frequency conversion cabinet, the direct current power distribution cabinet and the alternating current power distribution cabinet are all designed with aluminum-plastic cabinets.

In an embodiment of the present disclosure, a direct current power distribution device is also provided, and the device is configured to execute the above direct current power distribution method. The device includes a memory, a processor, and a computer program stored in the memory and executed by the processor, wherein when the computer program is executed by the processor, the processor implements the following steps:

determining working modes of a direct current power distribution system;

correspondingly obtaining, under different working modes, working parameters of the direct current power distribution system; and regulating operation of the direct current power distribution system according to the working parameters to achieve an electric energy balance of a power consumption side, a power generation side of a power grid and an energy storage side of the direct current power distribution system.

In an alternative embodiment, when implementing the step of regulating operation of the direct current power distribution system according to the working parameters, the processor specifically implements the following step: regulating operation of a direct current frequency conversion cabinet, an intelligent converter and an energy storage device in the direct current power distribution system according to the working parameters.

In an alternative embodiment, when implementing the step of determining working modes of a direct current power distribution system, the processor specifically implements the following step: determining the working modes including an intelligent converter priority output power mode and an intelligent converter constant power output mode.

In an alternative embodiment, when implementing the step of correspondingly obtaining, under different working modes, working parameters of the direct current power distribution system, the processor specifically implements the following steps: obtaining, in the intelligent converter priority output power mode, output power of the intelligent converter and a SoC value of the energy storage device;

and obtaining, in the intelligent converter constant power output mode, a frequency change of the direct current frequency conversion cabinet, the output power of the intelligent converter and the SoC value of the energy storage device.

By applying the technical solutions according to the embodiments of the present disclosure, for the direct current power distribution system, the direct current power distribution system may include different modules, the modules may be disassembled separately and used together, thereby facilitating design and selection, as well as installation and use. Installation of the energy storage device may reduce capacity design of a power grid system. The system control cabinet may control other modules, thereby realizing safe and stable operation of the system, and improving energy utilization efficiency. For the direct current power distribution method, status of the direct current frequency conversion cabinet, the energy storage device and the intelligent converter is comprehensively considered to realize a linkage between the load on the power consumption side and power supply. Under a condition of normally supplying electric energy to the load, service life of the energy storage device is prolonged and the electric energy is saved.

DETAILED DESCRIPTION OF THE EMBODIMENTS

The present disclosure will be further described in detail below in combination with accompanying drawings and specific embodiments. It may be understood that the specific embodiments described herein are only used to explain the present disclosure, rather than limiting the present disclosure.

In the following description, suffixes, such as "module", "part" or "unit", used to represent elements are used only for facilitating the description of the present disclosure, and have no specific meaning in itself. Therefore, "module", "part" or "unit" may be used in a mixed manner.

Figure 1:
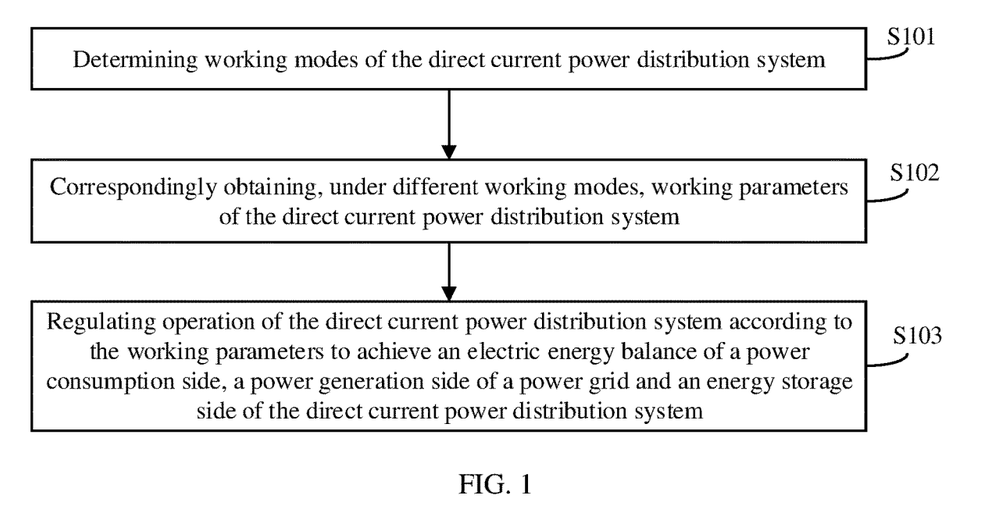
FIG. 1 is a flowchart of a direct current power distribution method according to an optional embodiment 1 of the present disclosure.

In order to solve a problem that customized design of low-voltage direct current power distribution is inconvenient, thereby affecting popularization of the low-voltage direct current power distribution in related technologies, an embodiment of the present disclosure provides a direct current power distribution method. The direct current power distribution method is applied to a direct current power distribution system. As shown in FIG. 1, the method includes the following steps.

Step S101, determining working modes of the direct current power distribution system.

Step S102, correspondingly obtaining, under different working modes, working parameters of the direct current power distribution system.

Step S103, regulating operation of the direct current power distribution system according to the working parameters to achieve an electric energy balance of a power consumption side, a power generation side of a power grid and an energy storage side of the direct current power distribution system.

As a result, status of a direct current frequency conversion cabinet, an energy storage device and an intelligent converter is comprehensively considered to realize a linkage between a load on the power consumption side and power supply. Under a condition of normally supplying electric energy to the load, service life of the energy storage device is prolonged and the electric energy is saved.

The determining working modes of the direct current power distribution system includes: determining the working modes including an intelligent converter priority output power mode and an intelligent converter constant power output mode.

Figure 2:
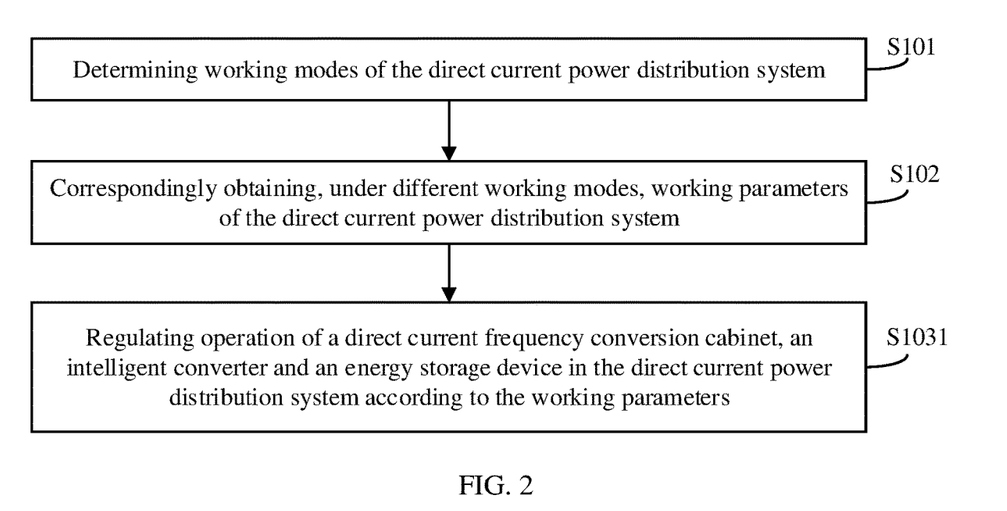
FIG. 2 is a flowchart of a direct current power distribution method according to an optional embodiment 2 of the present disclosure.

In a possible implementation manner, as shown in FIG. 2, Step S103, regulating operation of the direct current power distribution system according to the working parameters includes the following step. Step S1031, regulating operation of a direct current frequency conversion cabinet, an intelligent converter and an energy storage device in the direct current power distribution system according to the working parameters.

Figure 3:
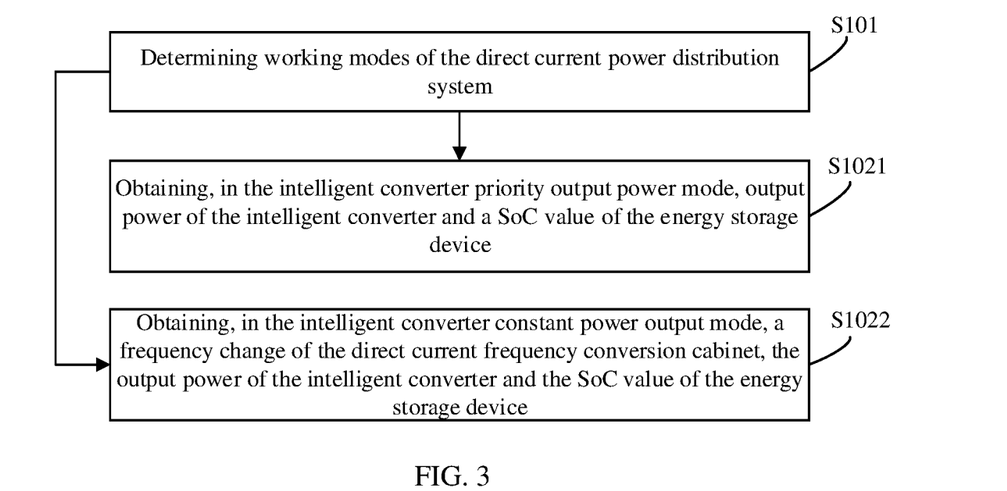
FIG. 3 is a flowchart of a direct current power distribution method according to an optional embodiment 3 of the present disclosure.

In a possible implementation manner, as shown in FIG. 3, Step S102, correspondingly obtaining, under different working modes, working parameters of the direct current power distribution system includes the following steps.

Step S1021, obtaining, in the intelligent converter priority output power mode, output power of the intelligent converter and a SoC value of the energy storage device.

Step S1022, obtaining, in the intelligent converter constant power output mode, a frequency change of the direct current frequency conversion cabinet, the output power of the intelligent converter and the SoC value of the energy storage device.

The regulating operation of the direct current power distribution system according to the working parameters includes: controlling the energy storage device to discharge, when the working mode is the intelligent converter priority output power mode, and the output power of the intelligent converter is determined to be greater than or equal to a first preset power value; or controlling the energy storage device to discharge, when the output power of the intelligent converter is determined to be less than a second preset power value. The second preset power value is less than the first preset power value.

Specifically, in a first case, the controlling the energy storage device to discharge, when the output power of the intelligent converter is determined to be greater than or equal to a first preset power value includes: controlling the energy storage device to successively increase discharge output power according to a first preset power increase value until a maximum discharge output power threshold is reached, when the SoC value is determined to be greater than a first preset SoC value; and when the SoC value is determined to be less than a second preset SoC value, controlling the energy storage device without starting a discharge function, or controlling the energy storage device to successively decrease the discharge output power according to a first preset power decrease value until zero is reached, or stopping discharging when a stop discharging instruction input by a user is received. The first preset SoC value is greater than the second preset SoC value, and the first preset power increase value is equal to the first preset power decrease value. In a second case, the controlling the energy storage device to discharge, when the output power of the intelligent converter is determined to be less than a second preset power value includes: controlling the energy storage device to successively decrease the discharge output power by the first preset power decrease value until zero is reached, and then stopping discharging.

It may be noted that when the working mode is the intelligent converter priority output power mode, the direct current power distribution system comprehensively considers the output power of the intelligent converter, the direct current frequency conversion cabinet and the energy storage device. Main principles are as follows. When the SoC value, that is storage capacity, of the energy storage device is low, the energy storage device enters a charging mode to avoid causing damage to itself. When the storage capacity of the energy storage device is high, the energy storage device does not need to be charged, and the energy storage device may be controlled to enter a discharge mode. When there are more loads connected to a side of the direct current frequency conversion cabinet, resulting in a higher frequency of the direct current frequency conversion cabinet and accordingly increasing the power of the intelligent converter, electricity fees on the power grid side may be increased. Therefore, the energy storage device may be controlled to discharge in this case to provide electrical energy for the intelligent converter to ensure the power of the intelligent converter. However, when the discharge reaches a certain level, it may be considered to prevent electric energy of the energy storage device from being too low and causing damage to the energy storage device, so that the discharge may be stopped.

In a possible implementation manner, the method further includes: controlling the energy storage device to charge according to an electricity price state and the SoC value, when the energy storage device is in a discharging stop state, and the output power of the intelligent converter is determined to be less than or equal to a third preset power value.

Figure 4:
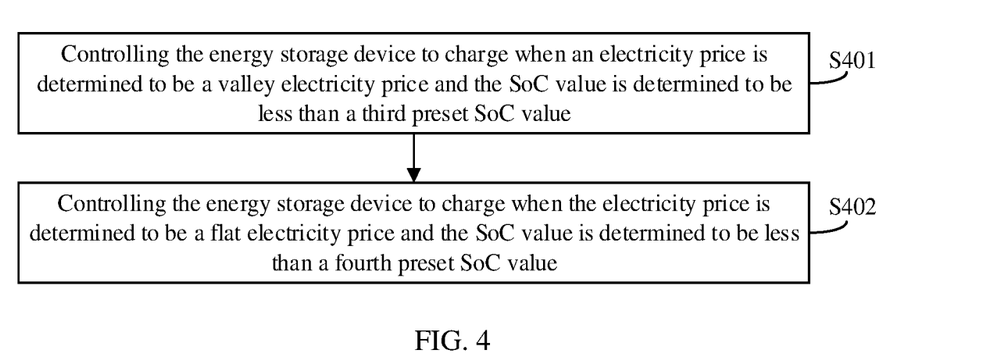
FIG. 4 is a flowchart of a direct current power distribution method according to an optional embodiment 4 of the present disclosure.

As shown in FIG. 4, the step of the controlling the energy storage device to charge according to an electricity price state and the SoC value includes the following steps.

Step S401, controlling the energy storage device to charge when an electricity price is determined to be a valley electricity price and the SoC value is determined to be less than a third preset SoC value.

Step S402, controlling the energy storage device to charge when the electricity price is determined to be a flat electricity price and the SoC value is determined to be less than a fourth preset SoC value.

It may be understood that when the energy storage device is charged, charging power of the energy storage device is controlled to successively increase from zero according to the first preset power increase value until the output power of the intelligent converter is monitored to be greater than or equal to a fourth preset power value, and then the charging power is controlled to stop increasing. The third preset SoC value is greater than the fourth preset SoC value. Moreover, when the energy storage device is in a charging state and the output power of the intelligent converter is determined to be greater than or equal to a fifth preset power value, the energy storage device is controlled to charge according to the electricity price state and the SoC value. Specifically, the controlling the energy storage device to charge according to the electricity price state and the SoC value includes: controlling the energy storage device to charge when the electricity price is determined to be the valley electricity price and the SoC value is determined to be greater than a fifth preset SoC value; controlling the energy storage device to charge when the electricity price is determined to be the flat electricity price and the SoC value is determined to be greater than a sixth preset SoC value; and controlling the charging power of the energy storage device to successively decrease according to a second preset power decrease value when the energy storage device is charged, and stopping charging until zero is reached. The second preset power decrease value is greater than the first preset power decrease value.

When the working mode is the intelligent converter priority output power mode, the direct current power distribution system comprehensively considers the output power of the intelligent converter, the direct current frequency conversion cabinet and the energy storage device. The main principles are as follows. When the SoC value, that is the storage capacity, of the energy storage device is low, the energy storage device enters a charging mode to avoid causing damage to itself. When the storage capacity of the energy storage device is high, the energy storage device does not need to be charged, and the energy storage device may be controlled to enter the discharge mode. When there are more loads connected to the side of the direct current frequency conversion cabinet, resulting in a higher frequency of the direct current inverter cabinet and accordingly increasing the power of the intelligent converter, the electricity fees on the power grid side may be increased. Therefore, the energy storage device may be controlled to discharge in this case to provide the electrical energy for the intelligent converter to ensure the power of the intelligent converter. However, when the discharge reaches the certain level, it may be considered to prevent the electric energy of the energy storage device from being too low and causing the damage to the energy storage device, so that the discharge may be stopped.

If a power grid state is at a valley electricity price, it means that grid power resources are relatively abundant and an electricity price is low at this time, so that an energy storage device may be controlled to charge in the case of low electricity to store electricity. In addition, it may be noted that since grid power is relatively abundant, the charging of the energy storage device may not affect operation of an intelligent converter and a direct current frequency conversion cabinet, and may not affect normal use of a load.

If the power grid state is at a flat electricity price, it means that the grid power resources are not abundant and the electricity price is high at this time, so that the energy storage device may be controlled to charge when the power is very low, so as to save money for users.

It may be understood that an energy storage device may also be in a forced charging mode and a forced discharging mode. When the energy storage device is in the forced charging mode and power of an intelligent converter is controlled to decrease to a sixth preset power value, the energy storage device is controlled to charge, and charging power of the energy storage device is controlled to successively increase according to a first preset power increase value until a maximum charging power threshold is reached. When a SoC value is monitored to be greater than or equal to a seventh preset SoC value, the charging power of the energy storage device is controlled to successively decrease according to a second preset power decrease value, and charging is stopped until zero is reached. When the energy storage device is in the forced discharging mode and the power of the intelligent converter is controlled to increase to a seventh preset power value, the energy storage device is controlled to discharge, and discharging power of the energy storage device is controlled to successively increase according to the first preset power increase value until a maximum discharging power threshold is reached. When the SoC value is monitored to be less than or equal to a second preset SoC value, the discharging power of the energy storage device is controlled to successively decrease according to the second preset power decrease value, and discharge is stopped until zero is reached.

It may be understood that when a direct current frequency conversion cabinet is monitored to successively increase a frequency according to a preset rate, an intelligent converter is controlled to increase output power to meet an actual power demand of a load connected with the direct current frequency conversion cabinet. When an output power value of the intelligent converter is monitored to be greater than or equal to an eighth preset power value, the direct current frequency conversion cabinet belonging to the intelligent converter is controlled to stop increasing the frequency. Output power of the direct current frequency conversion cabinet is a first preset power threshold, when a system is in an energy storage device discharge mode. The output power of the direct current frequency conversion cabinet is a second preset power threshold, when the system is in an energy storage discharge mode and a grid power supply mode.

It may be noted that when the working mode is the intelligent converter priority output power mode, the direct current power distribution system comprehensively considers the output power of the intelligent converter, the direct current frequency conversion cabinet and the energy storage device. The main principles are as follows. When the SoC value, that is the storage capacity, of the energy storage device is low, the energy storage device enters a charging mode to avoid causing damage to itself. When the storage capacity of the energy storage device is high, the energy storage device does not need to be charged, and the energy storage device may be controlled to enter the discharge mode. When there are more loads connected to the side of the direct current frequency conversion cabinet, resulting in a higher frequency of the direct current inverter cabinet and accordingly increasing the power of the intelligent converter, the electricity fees on the power grid side may be increased. Therefore, the energy storage device may be controlled to discharge in this case to provide the electrical energy for the intelligent converter to ensure the power of the intelligent converter. However, when the discharge reaches the certain level, it may be considered to prevent the electric energy of the energy storage device from being too low and causing the damage to the energy storage device, so that the discharge may be stopped.

In a possible implementation manner, the regulating operation of the direct current power distribution system according to the working parameters includes: controlling a direct current frequency conversion cabinet to automatically adjust a frequency until the power of an intelligent converter is monitored to be less than preset constant power and a difference between the power of the intelligent converter and the preset constant power is less than a preset difference, and then running according to preset constant power; and controlling an energy storage device to avoid working at this time.

As a result, status of the direct current frequency conversion cabinet, the energy storage device and the intelligent converter is comprehensively considered to realize a linkage between a load on a power consumption side and power supply. Under a condition of normally supplying electric energy to the load, service life of the energy storage device is prolonged and the electric energy is saved.

Figure 5:
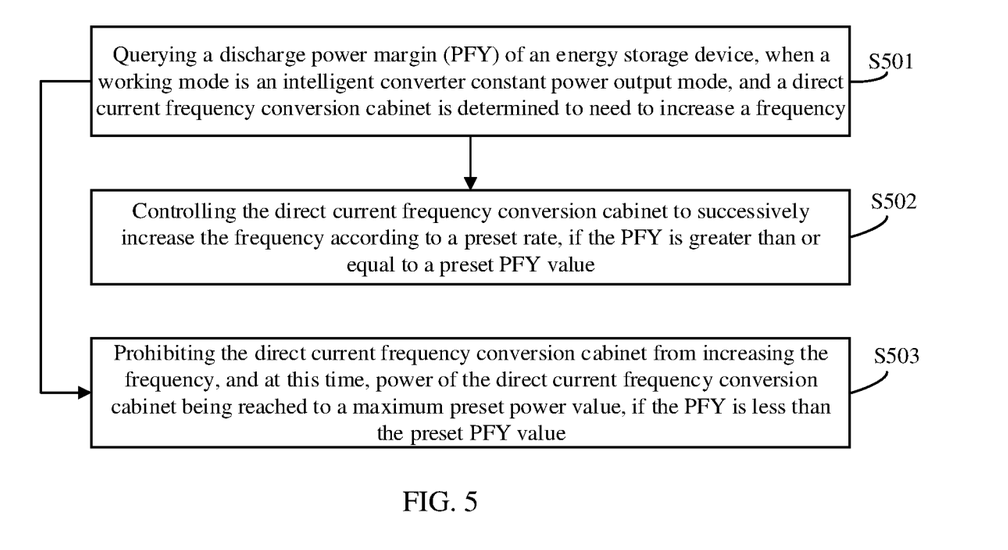
FIG. 5 is a flowchart of a direct current power distribution method according to an optional embodiment 5 of the present disclosure.

In a possible implementation manner, as shown in FIG. 5, the step of regulating operation of the direct current power distribution system according to the working parameters includes the following steps.

Step S501, querying a discharge power margin PFY of an energy storage device, when a working mode is an intelligent converter constant power output mode, and a direct current frequency conversion cabinet is determined to need to increase a frequency. Step S502, controlling the direct current frequency conversion cabinet to successively increase the frequency according to a preset rate, if the PFY is greater than or equal to a preset PFY value.

Step S503, prohibiting the direct current frequency conversion cabinet from increasing the frequency, and at this time, power of the direct current frequency conversion cabinet being reached to a maximum preset power value, if the PFY is less than the preset PFY value.

The PFY is determined according to current discharge power of the energy storage device, when the SoC value of the energy storage device is greater than a first preset SoC value.

As a result, when the PFY is sufficient, the power of the direct current frequency conversion cabinet is increased to prevent causing damage to the energy storage device.

In a possible implementation manner, the regulating operation of the direct current power distribution system according to the working parameters includes: when the working mode is the intelligent converter constant power output mode, a frequency of the direct current frequency conversion cabinet is determined to successively decrease and the energy storage device is in a discharging state, and the output power of the intelligent converter is monitored to be less than the preset constant power, controlling the energy storage device to successively decrease discharge output power according to the first preset power decrease value zero is reached, and then stopping discharge.

In a possible implementation manner, when the energy storage device is in a discharging stop state, the method includes: controlling the energy storage device to charge and controlling charging power to successively increase according to a first preset power increase value, if the output power of the intelligent converter is determined to be less than the preset constant power and a difference between the output power and the preset constant power is greater than a preset difference; stopping increasing the charging power, if the output power is determined to be greater than the preset constant power and the difference between the output power and the preset constant power is greater than the preset difference. The charging power is not greater than a maximum preset charging power value, and correspondingly, power of the intelligent converter is not less than a power critical value. The method further includes: controlling the charging power to successively decrease according to a second preset power decrease value until charging is stopped, if the SoC value is greater than a SoC critical value; controlling the direct current frequency conversion cabinet to automatically adjust the frequency, so that the output power of the intelligent converter is less than the preset constant power and the difference between the output power and the preset constant power is less than the preset difference, if the energy storage device is fully charged; performing charging and controlling the charging power to successively increase according to the first preset power increase value until a preset charging power threshold is reached, if the SoC value is less than a second preset SoC value; at the same time, controlling the power of the intelligent converter to successively decrease until being less than the preset constant power and a difference between the power and the preset constant power is less than a preset difference; and stopping the charging, when the SoC value is greater than the second preset SoC value.

It may be understood that the direct current power distribution system comprehensively considers the output power of the intelligent converter, the direct current frequency conversion cabinet and the energy storage device. The main principles are as follows. When the SoC value, that is the storage capacity, of the energy storage device is low, the energy storage device enters a charging mode to avoid causing damage to itself. When the storage capacity of the energy storage device is high, the energy storage device does not need to be charged, and the energy storage device may be controlled to enter the discharge mode. When there are more loads connected to the side of the direct current frequency conversion cabinet, resulting in a higher frequency of the direct current inverter cabinet and accordingly increasing the power of the intelligent converter, the electricity fees on the power grid side may be increased. Therefore, the energy storage device may be controlled to discharge in this case to provide the electrical energy for the intelligent converter to ensure the power of the intelligent converter. However, when the discharge reaches the certain level, it may be considered to prevent the electric energy of the energy storage device from being too low and causing the damage to the energy storage device, so that the discharge may be stopped.

Figure 6:
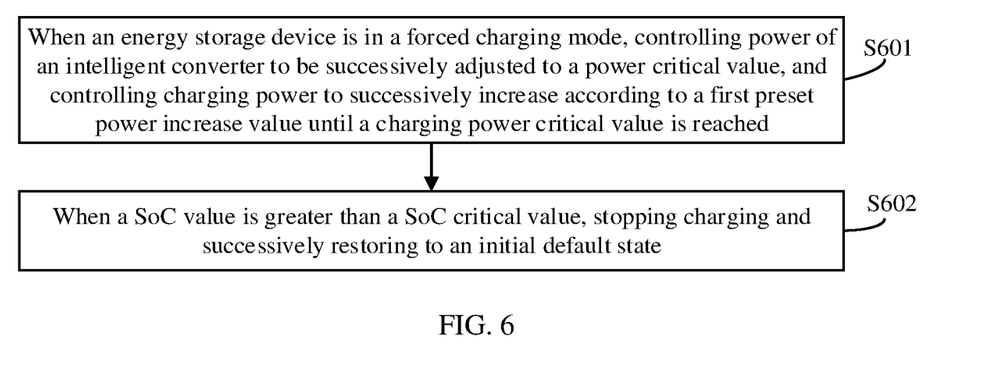
FIG. 6 is a flowchart of a direct current power distribution method according to an optional embodiment 6 of the present disclosure.

In a possible implementation manner, as shown in FIG. 6, the method further includes the following steps.

Step S601, when an energy storage device is in a forced charging mode, controlling power of an intelligent converter to be successively adjusted to a power critical value, and controlling charging power to successively increase according to a first preset power increase value until a charging power critical value is reached.

Step S602, when a SoC value is greater than a SoC critical value, stopping charging and successively restoring to an initial default state.

As a result, in the forced charging mode, the power of the intelligent converter may be controlled to be low enough, but operation of a load may not be affected.

Figure 7:
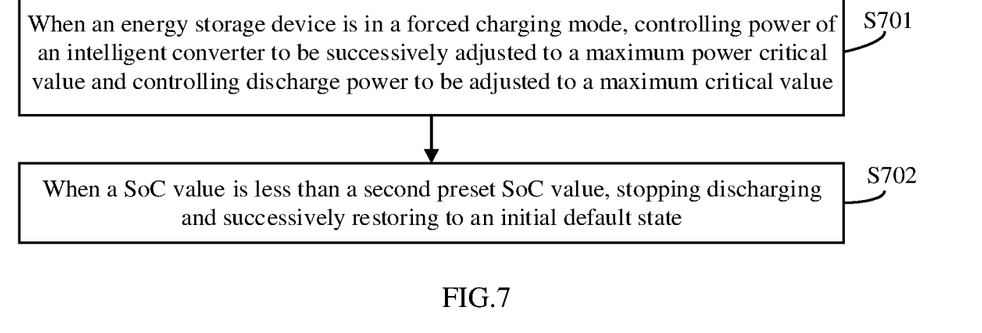
FIG. 7 is a flowchart of a direct current power distribution method according to an optional embodiment 7 of the present disclosure.

In a possible implementation manner, as shown in FIG. 7, the method further includes the following steps.

Step S701, when an energy storage device is in a forced charging mode, controlling power of an intelligent converter to be successively adjusted to a maximum power critical value and controlling discharge power to be adjusted to a maximum critical value.

Step S702, when a SoC value is less than a second preset SoC value, stopping discharging and successively restoring to an initial default state.

As a result, in order to achieve maximum discharge, the discharge power of the intelligent converter may be controlled to be large enough, within a range that the intelligent converter may reach, to achieve discharge.

In the following, a specific application example is used to illustrate a regulation method in the above two modes. An intelligent converter may be a three-phase intelligent converter with power of 20 KW. An energy storage device is an energy storage cabinet with maximum power of 10 KW. Power of a direct current frequency conversion cabinet is recorded as 30 KW. In other words, a power ratio of the above three devices is configured in 2:1:3. The direct current frequency conversion cabinet operates according to limited power. In normal operation, the maximum power is 20 KW. Under extreme working conditions, for example, under a working condition of energy storage discharge plus grid power supply, the power may reach 30 KW. If energy storage discharge is existed, the direct current frequency conversion cabinet may operate for 0.5 hours at the power of 10 KW.

Functions of an energy storage device include supplementing peak power and operating in emergency.

When a working mode is an intelligent converter priority output power mode, the following energy storage DC refers to the energy storage device mentioned above.

An intelligent converter may be used to stabilize voltage of a direct current bus in real time. Power of the intelligent converter may be automatically adjusted, and maximum power is 20 KW. Power of a direct current frequency conversion cabinet on a power consumption side is usually limited to operate within 20 KW, and in a case of energy storage discharge, peak power may operate at 30 KW. When the direct current frequency conversion cabinet increases the power, a frequency is successively increased at a rate of 1 Hz/s. The intelligent converter automatically responds to the frequency of the direct current frequency conversion cabinet in real time to increase power output to meet an actual power demand. When the energy storage DC monitors, through communication data, the output power of the intelligent converter Pb>=20 KW, if SoC>25% at this time, the energy storage DC may successively increase discharge output power at 0.5 KW until a maximum of the discharge output power reaches 10 KW. If SoC<20% at this time, the energy storage DC does not start the discharge, or the discharge output power may successively reduced at 0.5 KW, until the discharge is turned off.

If the direct current frequency conversion cabinet monitors that the output power of the intelligent converter continues to increase to Pb>=21 KW, it indicates that the energy storage DC may no longer supplement power, so that the direct current frequency conversion cabinet may not continue to increase the frequency.

When the energy storage DC monitors that the output power of the intelligent converter Pb<19 KW through communication, the energy storage DC successively reduces the discharge output power at 0.5 KW until 0 is reached, and then the discharging is stopped.

If the energy storage DC is in a discharging stop state, and the energy storage DC monitors the output power of the intelligent converter Pb<=16 KW through communication: (a) if an electricity price is a valley electricity price and SoC<85%, charging is started; and (b) if the electricity price is a flat electricity price and SoC<45%, the charging is started. Charging power increases successively from 0 to meet Pb<17, and increases by 0.5 KW each time. When Pb>=17 KW, the charging power is controlled to stop increasing.

In a charging state, if the energy storage DC monitors, that output power of the intelligent converter is greater than or equal to 18 KW (including increase of an electrical load at this time) through communication, the charging power is successively reduced by 1 KW until 0 is reached, and then the charging is stopped.

If the electricity price is the valley electricity price, after SoC>95%, the charging power is successively reduced at 1 KW until 0 is reached, and the charging is stopped.

If the electricity price is the flat electricity price, after SoC>70%, the charging power is successively reduced at 1 KW until 0 is reached, and the charging is stopped.

If the energy storage DC is set for forced charging, operating power of the load is reduced to 10 KW firstly, and then the charging is started. The charging power is successively increased at 0.5 KW until the maximum charging power 10 KW is reached. After SoC>=95%, the charging power is successively reduced at 1 KW until 0 is reached, and then the charging is stopped.

If the energy storage DC is set for forced discharging, the operating power of the load is reduced to 15 KW firstly, and then the discharging is started. The discharging power is successively increased at 0.5 KW until the maximum discharging power 10 KW is reached. After SoC<20%, the discharging power is successively reduced at 1 KW until 0 is reached, and then the discharging is stopped.

When a working mode is an intelligent converter constant power output mode, the following energy storage DC refers to the energy storage device mentioned above.

If an intelligent converter is set to output at constant power of 15 KW, at this time, default is that a loaded direct current frequency conversion cabinet automatically adjusts a frequency to meet 14.5 KW<Pb<15 KW to operate, and the energy storage does not work.

Before the direct current frequency conversion cabinet needs to increase the power, increaseable discharge power margin PFY of the energy storage DC is queried, so that increaseable power is determined to be the PFY. The PFY is determined by the energy storage DC according to current energy storage capacity SoC>25% and current discharge power. If PFY>=1, the direct current frequency conversion cabinet may successively increase a frequency at a rate of 1 Hz/s. If PFY<1, the power of the direct current frequency conversion cabinet is controlled to stop increasing, and not allowed to increase. That is, default is that maximum operating power of the direct current frequency conversion cabinet is 24 KW.

When the direct current frequency conversion cabinet successively reduces the frequency, if the energy storage DC is in a discharging state and the energy storage DC monitors that the output power of the intelligent converter Pb<15 KW through communication, the energy storage DC successively reduces the discharge output power at 0.5 KW until 0 is reached, and then the discharging is stopped.

When the energy storage DC is in a stopped state and the energy storage DC is in SoC<85%, if the output power of the intelligent converter is monitored to be in Pb<14.5 KW, the energy storage DC starts charging. The charging power is controlled to successively increase at 0.5 KW. If Pb>=15.5 KW, the charging power is controlled to stop increasing. The maximum charging power is 10 KW, that is, the load power may not be lower than 5 KW. If SoC>95%, the charging power is reduced successively at 1 KW until the charging is stopped. When the energy storage is full and cannot be recharged, the direct current frequency conversion cabinet may automatically adjust and increase the power to operate to meet 14.5 KW<Pb<15 KW.

If the energy storage is in SoC<20%, the charging is started. The charging power is increased successively at 0.5 KW until 5 KW is reached. At the same time, fan power is reduced successively until 14.5 KW<Pb<15 KW is met. Until SoC>20%, a current mode is exited.

If the energy storage is forced to charge, output power of a variable frequency fan may be successively adjusted to 5 KW, and at the same time, the charging may be adjusted to successively increase at 0.5 KW until the maximum power 10 KW is reached. Until SoC>95%, the charging is stopped, and then a default state is restored successively.

If the energy storage is forced to discharge, the output power of the variable frequency fan may be successively adjusted to 25 KW, and at the same time, the discharge power is adjusted to 10 KW. Until SoC<20%, the discharging is stopped and the default state is restored successively.

As a result, status of the direct current frequency conversion cabinet, the energy storage device and the intelligent converter is comprehensively considered to realize a linkage between the load on the power consumption side and power supply. Under a condition of normally supplying electric energy to the load, service life of the energy storage device is prolonged and the electric energy is saved.

Figure 8:
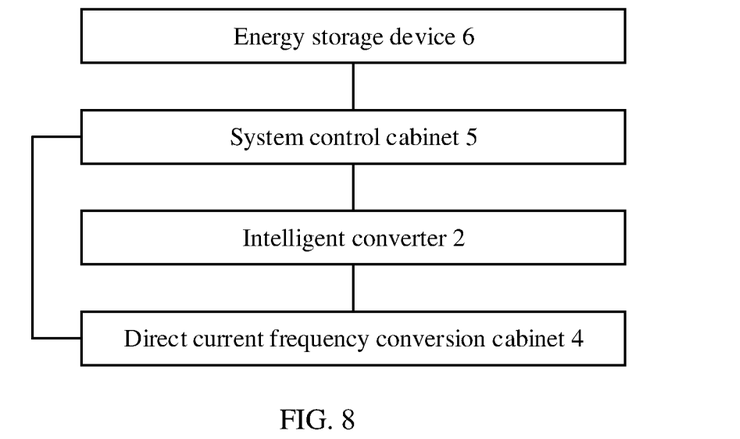
FIG. 8 is a structural block diagram of a direct current power distribution system according to an optional embodiment 1 of the present disclosure.

FIG. 8 is a structural block diagram of a direct current power distribution system according to an optional embodiment 1 of the present disclosure. The system is used to execute the direct current power distribution method of the above embodiments. The system includes: a system control cabinet 5, an intelligent converter 2, a direct current frequency conversion cabinet 4 and an energy storage device 6.

The intelligent converter 2 is connected with the direct current frequency conversion cabinet 4, and is configured to provide electrical energy to the direct current frequency conversion cabinet 4.

The direct current frequency conversion cabinet 4 is configured as a load connected to a power consumption side.

The system control cabinet 5 is respectively connected with the intelligent converter 2, the direct current frequency conversion cabinet 4 and the energy storage device 6. The system control cabinet 5 is configured to obtain working parameters of the intelligent converter 2, the direct current frequency conversion cabinet 4 and the energy storage device 6, and regulate operation of the direct current power distribution system according to the working parameters to achieve an electric energy balance of the power consumption side, a power grid side and a side of the energy storage device 6.

As a result, by the regulating of the direct current power distribution system, an electric energy balance of the power consumption side, a power generation side of a power grid and an energy storage side is achieved. Moreover, the direct current power distribution system may be convenient for users to design and select, and is convenient for installation and use. Installation of the energy storage device may reduce capacity design of a power grid system. The system control cabinet may control other modules, thereby improving energy utilization efficiency.

Figure 9:
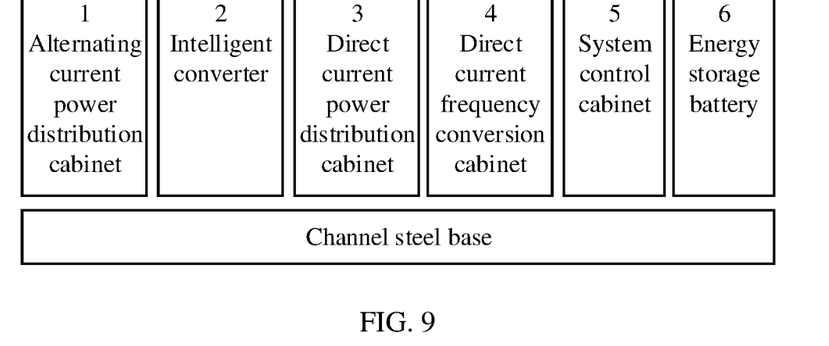
FIG. 9 is a structural block diagram of a direct current power distribution system according to an optional embodiment 2 of the present disclosure.

In a possible implementation manner, as shown in FIG. 9, the above system further includes: an alternating current power distribution cabinet 1. The alternating current power distribution cabinet 1 is respectively connected with a power grid system, an intelligent converter 2 and a system control cabinet 5. The alternating current power distribution cabinet 1 is configured to: transmit electrical energy of the power grid system to the direct current power distribution system, provide alternating current power to the intelligent converter 2, connect with an alternating current load and provide electrical energy to the connected alternating current load. The alternating current power distribution cabinet 1 is configured to monitor power input from the power grid system and power consumption of each branch load, and send a monitoring result to the system control cabinet 5, so that the system control cabinet 5 performs analysis according to the monitoring result. The alternating current power distribution cabinet 1 has an electrical energy input isolation switch and an electrical energy output isolation switch, and internal components of the alternating current power distribution cabinet 1 are arranged in a hierarchical manner.

The alternating current power distribution cabinet, as an interface of a public power grid, has an input isolation switch and an output isolation switch, so that energy data on input and output electric energy may be collected at the same time. Moreover, an aluminum-plastic box is used as a main body, and a device layout with high functions and compact density is designed. The hierarchical manner is adopted to make full use of space. The alternating current power distribution cabinet include an energy monitoring module. Therefore, monitoring and analysis of real-time data of input electric energy and output voltage, current, power and electricity of each branch power supply, and then upload a result to an energy management platform to realize transparency of energy data. The power distribution cabinet adopts a standard aluminum-plastic box with good heat dissipation and sealing protection.

In a possible implementation manner, as shown in FIG. 9, the above system further includes: a direct current power distribution cabinet 3. The direct current power distribution cabinet 3 is respectively connected with a system control cabinet 5, a direct current frequency conversion cabinet 4 and an intelligent converter 2. The direct current power distribution cabinet 3 is configured to receive electrical energy provided by the intelligent converter 2, connect with a direct current power generation system and/or a direct current load, and provide electrical energy to the direct current frequency conversion cabinet 4 and/or the direct current load. The direct current power distribution cabinet 3 is configured to provide a dual power supply capability for the direct current power distribution system. The direct current power distribution cabinet 3 is equipped with a direct current circuit breaker and a fuse inside, and has protection functions of over-current and over-voltage.

The direct current power distribution cabinet 3 is further configured to connect to the direct current power generation system through a direct current bus, output a first preset direct current voltage, a second preset direct current voltage and a preset isolation safety voltage value through a DC/DC conversion mode of the intelligent converter 2. The direct current power distribution cabinet 3 is further configured to monitor a power condition obtained from the direct current bus and the power consumption of each branch direct current load, and send a monitoring result to the system control cabinet 5, so that the system control cabinet performs analysis according to the monitoring result.

The direct current power distribution cabinet inputs 650V to the direct current bus, and outputs power distribution 400V DC, 200V DC and an isolated safety voltage of 48V DC through DC/DC conversion. As for the output direct current of each branch, in addition to corresponding protective measures such as over-current and over-voltage in terms of control, a device such as a direct current circuit breaker and a fuse is also equipped to ensure safety of power distribution of each branch. At the same time, a direct current energy monitoring module is equipped to realize transparent and safe management of energy. Direct current power distribution capacity of single-branch maximum 5 KW and dual-branch 10 KW is provided.

In a possible implementation manner, an intelligent converter 2 may also be connected to a direct current power generation system, a power grid system and an AC/DC load, and is configured to perform power transmission.

It may be noted that the direct current power generation system is a photovoltaic power generation system.

In a possible implementation manner, the direct current frequency conversion cabinet 4 is connected with the intelligent converter 2 and an alternating current load, and is configured to output a frequency conversion voltage to the connected alternating current load. The direct current frequency conversion cabinet 4 is connected with a direct current bus and has multiple power consumption interfaces, and is configured to drive frequency conversion operation of the load when total power of the connected load is less than or equal to a power threshold of the direct current frequency conversion cabinet 4. The load is a motor.

Input of the direct current frequency conversion cabinet is a high-voltage direct current bus 650V, and output is frequency conversion power, so as to drive frequency conversion operation and regulation of a fan of an air conditioning system. The direct current frequency conversion cabinet may directly use direct current power supply, and may realize multiple drives. For example, when a power threshold of the direct current frequency conversion cabinet is 30 KW, one direct current frequency conversion cabinet may realize to drive frequency conversion operation and regulation of three air-conditioning blowers with power of 10 KW.

A sealing protection structure of an aluminum-plastic box is used to improve performance, and a problem of heat dissipation is solved. A communication port communicates with a control center to receive control instructions.

In a possible implementation manner, the system control cabinet 5 is configured to collect operating data information of the alternating current power distribution cabinet 1, the intelligent converter 2, the direct current power distribution cabinet 3, the direct current frequency conversion cabinet 4 and the energy storage device 6 through a communication interface. The system control cabinet 5 is configured to generate an operation strategy and issue a control instruction according to the operation strategy to control a coordination work of the alternating current power distribution cabinet 1, the intelligent converter 2, the direct current power distribution cabinet 3, the direct current frequency conversion cabinet 4 and the energy storage device 6.

In a possible implementation manner, the energy storage device 6 is configured to perform charging or discharging under the control instruction.

In a possible implementation manner, the system control cabinet 5, the direct current frequency conversion cabinet 4, the direct current power distribution cabinet 3 and the alternating current power distribution cabinet 1 are all designed with aluminum-plastic cabinets. The aluminum-plastic cabinets have good heat dissipation, may protect internal components, have neat and unified appearances, and are convenient for design and selection. Modular design is convenient for model selection. In addition, FIG. 9 shows that six modules are located on a channel steel base, which is more stable.

Figure 10:
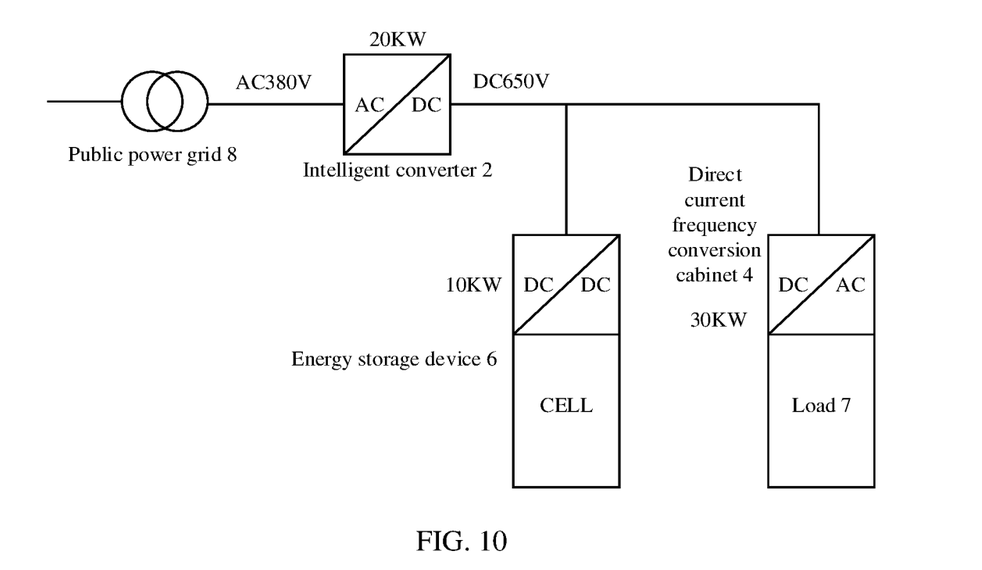
FIG. 10 is a structural block diagram of a direct current power distribution system according to an optional embodiment 3 of the present disclosure.

FIG. 10 is a structural block diagram of a direct current power distribution system according to an optional embodiment 3 of the present disclosure. A public power grid 8, an intelligent converter 2, an energy storage device 6, a direct current frequency conversion cabinet 4 and a load 7 are arranged from left to right. Lines connecting these components may be understood as direct current buses.

Figure 11:
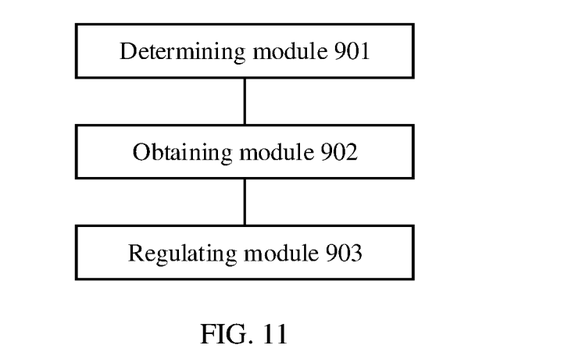
FIG. 11 is a structural block diagram of a direct current power distribution device according to an optional embodiment 4 of the present disclosure.

The embodiments of the present disclosure provide a direct current power distribution device being configured to execute a method shown in the above embodiments. As shown in FIG. 11, the device includes the following modules.

A determining module 901, configured to determine working modes of a direct current power distribution system.

An obtaining module 902, configured to correspondingly obtain, under different working modes, working parameters of the direct current power distribution system.

A regulating module 903, configured to regulate operation of the direct current power distribution system according to the working parameters to achieve an electric energy balance of a power consumption side, a power generation side of a power grid and an energy storage side of the direct current power distribution system.

In a possible implementation manner, the regulating module 903 is configured to regulate operation of a direct current frequency conversion cabinet, an intelligent converter and an energy storage device in the direct current power distribution system according to the working parameters.

In a possible implementation manner, the determining module 901 is configured to determine the working modes including an intelligent converter priority output power mode and an intelligent converter constant power output mode.

In a possible implementation manner, the obtaining module 902 is configured to obtain, in the intelligent converter priority output power mode, output power of the intelligent converter and a SoC value of the energy storage device, and obtain, in the intelligent converter constant power output mode, a frequency change of the direct current frequency conversion cabinet, the output power of the intelligent converter and the SoC value of the energy storage device.

As a result, status of the direct current frequency conversion cabinet, the energy storage device and the intelligent converter is comprehensively considered to realize a linkage between the load on the power consumption side and power supply. Under a condition of normally supplying electric energy to the load, service life of the energy storage device is prolonged and the electric energy is saved.

It may be noted that in this article, terms "include", "contain" or any other variants thereof are intended to cover non-exclusive inclusion, so that a process, method, article or device including a series of elements not only includes those elements, but also includes other elements that are not explicitly listed, or elements inherent to the process, method, article, or device. If there are no more restrictions, an element defined by a sentence "including a . . . " does not exclude existence of other identical elements in the process, method, article, or device that includes the element.

Sequence numbers of the above mentioned embodiments of the present disclosure are only for description, and do not represent advantages and disadvantages of the embodiments.

Through the description of the above embodiments, those skilled in the art may clearly understand that the methods of the above embodiments may be implemented by means of a software plus a necessary general hardware platform. Of course, a hardware may also be used, but in many cases the former is a better implementation. Based on this understanding, the technical solutions of the present disclosure may be embodied in a form of software product in essence or the part that contributes to related technologies. The computer software product is stored in a storage medium (such as a ROM/RAM, a magnetic disk and an optical disk), and includes several instructions to make a mobile terminal (may be a mobile phone, computer, server, air conditioner, or network device, etc.) to execute the methods described in each embodiment of the present disclosure.

The embodiments of the present disclosure are described above with reference to the accompanying drawings, but the present disclosure is not limited to the above mentioned specific implementations. The above mentioned specific implementations are only illustrative and not restrictive. Under enlightenment of the present disclosure, those skilled in the art may make many forms without departing from the purpose of the present disclosure and the scope of protection of the claims, and these all fall within the protection of the present disclosure.

What is claimed is:

1. A direct current power distribution method, being applied to a direct current power distribution system, comprising:
   determining working modes of the direct current power distribution system;
   correspondingly obtaining, under different working modes, working parameters of the direct current power distribution system; and
   regulating operation of the direct current power distribution system according to the working parameters to achieve an electric energy balance of a power consumption side, a power generation side of a power grid, and an energy storage side of the direct current power distribution system,
   wherein the regulating operation of the direct current power distribution system according to the working parameters comprises: regulating operation of a direct current frequency conversion cabinet, an intelligent converter and an energy storage device in the direct current power distribution system according to the working parameters;
   the determining working modes of the direct current power distribution system comprises: determining the working modes comprising an intelligent converter priority output power mode and an intelligent converter constant power output mode; and
   the correspondingly obtaining, under different working modes, working parameters of the direct current power distribution system comprises: obtaining, in the intelligent converter priority output power mode, output power of the intelligent converter and a state of charge (SoC) value of the energy storage device; and obtaining, in the intelligent converter constant power output mode, a frequency change of the direct current frequency conversion cabinet, the output power of the intelligent converter and the SoC value of the energy storage device.

2. The method according to claim 1, wherein the regulating operation of the direct current power distribution system according to the working parameters comprises:
   controlling the energy storage device to discharge, when the working mode is the intelligent converter priority output power mode, and the output power of the intelligent converter is determined to be greater than or equal to a first preset power value; or
   controlling the energy storage device to discharge, when the output power of the intelligent converter is determined to be less than a second preset power value,
   wherein the second preset power value is less than the first preset power value.

3. The method according to claim 2, wherein the controlling the energy storage device to discharge, when the output power of the intelligent converter is determined to be greater than or equal to a first preset power value comprises:
   controlling the energy storage device to successively increase discharge output power according to a first preset power increase value until a maximum discharge output power threshold is reached, when the SoC value is determined to be greater than a first preset SoC value; and
   when the SoC value is determined to be less than a second preset SoC value, controlling the energy storage device without starting a discharge function, or controlling the energy storage device to successively decrease the discharge output power according to a first preset power decrease value until zero is reached, or stopping discharging when a stop discharging instruction input by a user is received,
   wherein the first preset SoC value is greater than the second preset SoC value, and the first preset power increase value is equal to the first preset power decrease value.

4. The method according to claim 3, wherein the method further comprises:
   controlling the energy storage device to charge according to an electricity price state and the SoC value, when the energy storage device is in a discharging stop state, and the output power of the intelligent converter is determined to be less than or equal to a third preset power value.

5. The method according to claim 4, wherein the controlling the energy storage device to charge according to an electricity price state and the SoC value comprises:
controlling the energy storage device to charge when an electricity price is determined to be a valley electricity price and the SoC value is determined to be less than a third preset SoC value;
controlling the energy storage device to charge when the electricity price is determined to be a flat electricity price and the SoC value is determined to be less than a fourth preset SoC value; and
controlling charging power of the energy storage device to successively increase from zero according to the first preset power increase value when the energy storage device is charged, and stopping increasing the charging power until the output power of the intelligent converter is monitored to be greater than or equal to a fourth preset power value,
wherein the third preset SoC value is greater than the fourth preset SoC value.

6. The method according to claim 4, wherein the method further comprises:
controlling the energy storage device to charge according to the electricity price state and the SoC value, when the energy storage device is in a charging state and the output power of the intelligent converter is determined to be greater than or equal to a fifth preset power value.

7. The method according to claim 6, wherein the controlling the energy storage device to charge according to the electricity price state and the SoC value comprises:
controlling the energy storage device to charge when an electricity price is determined to be a valley electricity price and the SoC value is determined to be greater than a fifth preset SoC value;
controlling the energy storage device to charge when the electricity price is determined to be a flat electricity price and the SoC value is determined to be greater than a sixth preset SoC value; and
controlling charging power of the energy storage device to successively decrease according to a second preset power decrease value when the energy storage device is charged, and stopping charging until zero is reached,
wherein the second preset power decrease value is greater than the first preset power decrease value.

8. The method according to claim 2, wherein the controlling the energy storage device to discharge, when the output power of the intelligent converter is determined to be less than a second preset power value comprises:
controlling the energy storage device to successively decrease discharge output power by a first preset power decrease value until zero is reached, and then stopping discharging.

9. The method according to claim 2, wherein the method further comprises:
when the energy storage device is in a forced charging mode and power of the intelligent converter is controlled to decrease to a sixth preset power value, controlling the energy storage device to charge, and controlling charging power of the energy storage device to successively increase according to a first preset power increase value until a maximum charging power threshold is reached; and
when the SoC value is monitored to be greater than or equal to a seventh preset SoC value, controlling the charging power of the energy storage device to successively decrease according to a second preset power decrease value, and stopping charging until zero is reached.

10. The method according to claim 2, wherein the method further comprises:
when the energy storage device is in a forced discharging mode and power of the intelligent converter is controlled to increase to a seventh preset power value, controlling the energy storage device to discharge, and controlling discharging power of the energy storage device to successively increase according to a first preset power increase value until a maximum discharging power threshold is reached; and
when the SoC value is monitored to be less than or equal to a second preset SoC value, controlling the discharging power of the energy storage device to successively decrease according to a second preset power decrease value, and stopping discharging until zero is reached.

11. The method according to claim 2, wherein the method further comprises:
controlling the intelligent converter to increase the output power to meet an actual power demand of a load connected with the direct current frequency conversion cabinet, when the direct current frequency conversion cabinet is monitored to successively increase a frequency according to a preset rate; and
controlling the direct current frequency conversion cabinet belonging to the intelligent converter to stop increasing the frequency, when an output power value of the intelligent converter is monitored to be greater than or equal to an eighth preset power value,
wherein the output power of the direct current frequency conversion cabinet is a first preset power threshold, when the system is in an energy storage device discharge mode, or the output power of the direct current frequency conversion cabinet is a second preset power threshold, when the system is in an energy storage discharge mode and a grid power supply mode.

12. The method according to claim 1, wherein the regulating operation of the direct current power distribution system according to the working parameters comprises:
controlling the direct current frequency conversion cabinet to automatically adjust a frequency until the output power of the intelligent converter is monitored to be less than preset constant power and a difference between the output power of the intelligent converter and the preset constant power is less than a preset difference, and then running according to the preset constant power; and controlling the energy storage device to avoid working at this time.

13. The method according to claim 1, wherein the regulating operation of the direct current power distribution system according to the working parameters comprises:
querying a discharge power margin PFY of the energy storage device, when the working mode is the intelligent converter constant power output mode, and the direct current frequency conversion cabinet is determined to need to increase a frequency;
controlling the direct current frequency conversion cabinet to successively increase the frequency according to a preset rate, if the PFY is greater than or equal to a preset PFY value; and
prohibiting the direct current frequency conversion cabinet from increasing the frequency, and at this time, power of the direct current frequency conversion cabinet being reached to a maximum preset power value, if the PFY is less than the preset PFY value, wherein the PFY is determined according to current discharge power of the energy storage device, when the SoC value of the energy storage device is greater than a first preset SoC value.

14. The method according to claim 1, wherein the regulating operation of the direct current power distribution system according to the working parameters comprises:
when the working mode is the intelligent converter constant power output mode, a frequency of the direct current frequency conversion cabinet is determined to successively decrease and the energy storage device is in a discharging state, and the output power of the intelligent converter is monitored to be less than preset constant power, controlling the energy storage device to successively decrease discharge output power according to a first preset power decrease value until zero is reached, and then stopping discharging.

15. The method according to claim 14, wherein when the energy storage device is in a discharging stop state, the method comprises:
controlling the energy storage device to charge and controlling charging power to successively increase according to a first preset power increase value, if the output power of the intelligent converter is determined to be less than the preset constant power and a difference between the output power and the preset constant power is greater than a preset difference;
stopping increasing the charging power, if the output power is determined to be greater than the preset constant power and the difference between the output power and the preset constant power is greater than the preset difference,
wherein the charging power is not greater than a maximum preset charging power value, and correspondingly, power of the intelligent converter is not less than a power critical value;
controlling the charging power to successively decrease according to a second preset power decrease value until charging is stopped, if the SoC value is greater than a SoC critical value;
controlling the direct current frequency conversion cabinet to automatically adjust the frequency, so that the output power of the intelligent converter is less than the preset constant power and the difference between the output power and the preset constant power is less than the preset difference, if the energy storage device is fully charged;
performing charging and controlling the charging power to successively increase according to the first preset power increase value until a preset charging power threshold is reached, if the SoC value is less than a second preset SoC value;
at the same time, controlling the output power of the intelligent converter to successively decrease until being less than the preset constant power and a difference between the output power and the preset constant power is less than a preset difference; and
stopping the charging, when the SoC value is greater than the second preset SoC value.

16. The method according to claim 1, wherein the method further comprises:
when the energy storage device is in a forced charging mode, controlling power of the intelligent converter to be successively adjusted to a power critical value, and controlling the charging power to successively increase according to a first preset power increase value until a charging power critical value is reached; and
stopping charging and successively restoring to an initial default state, when the SoC value is greater than a SoC critical value.

17. The method according to claim 1, wherein the method further comprises:
when the energy storage device is in a forced discharging mode, controlling power of the intelligent converter to be successively adjusted to a maximum power critical value, and controlling discharge power to be adjusted to a maximum critical value; and
stopping discharging and successively restoring to an initial default state, when the SoC value is less than a second preset SoC value.

18. A direct current power distribution system, being used to execute a direct current power distribution method according to claim 1, comprising: a system control cabinet, an intelligent converter, a direct current frequency conversion cabinet and an energy storage device,
the intelligent converter being connected with the direct current frequency conversion cabinet and configured to provide electrical energy to the direct current frequency conversion cabinet;
the direct current frequency conversion cabinet being configured as a load connected with a power consumption side; and
the system control cabinet being respectively connected with the intelligent converter, the direct current frequency conversion cabinet and the energy storage device, and configured to obtain working parameters of the intelligent converter, the direct current frequency conversion cabinet and the energy storage device, and regulate operation of the direct current power distribution system according to the working parameters to achieve an electric energy balance of a power consumption side, a power grid side and an energy storage device side.

19. A direct current power distribution device, being configured to execute a method described in claim 1, comprising a memory, a processor, and a computer program stored in the memory and executed by the processor, wherein when the computer program is executed by the processor, the processor implements the following steps:
determining working modes of a direct current power distribution system;
correspondingly obtaining, under different working modes, working parameters of the direct current power distribution system; and
regulating operation of the direct current power distribution system according to the working parameters to achieve an electric energy balance of a power consumption side, a power generation side of a power grid and an energy storage side of the direct current power distribution system.

* * * * *